United States Patent
Bennett et al.

(10) Patent No.: US 7,433,300 B1
(45) Date of Patent: Oct. 7, 2008

(54) SYNCHRONIZATION OF CONFIGURATION DATA IN STORAGE-AREA NETWORKS

(75) Inventors: Steven James Bennett, Maple Grove, MN (US); Nancy J. Golio, Plymouth, MN (US)

(73) Assignee: Cisco Technology, Inc., San Jose, CA (US)

(*) Notice: Subject to any disclaimer, the term of this patent is extended or adjusted under 35 U.S.C. 154(b) by 926 days.

(21) Appl. No.: 10/401,654

(22) Filed: Mar. 28, 2003

(51) Int. Cl.
*H04J 1/16* (2006.01)

(52) U.S. Cl. .................. 370/216; 370/242; 370/254; 370/401; 711/162; 714/6

(58) Field of Classification Search ......... 370/216–228, 370/242, 360, 363, 368; 711/162; 714/6
See application file for complete search history.

(56) References Cited

U.S. PATENT DOCUMENTS

| | | | |
|---|---|---|---|
| 4,495,617 A | 1/1985 | Ampulski et al. |
| 5,390,326 A | 2/1995 | Shah |
| 5,461,608 A | 10/1995 | Yoshiyama |
| 5,473,599 A | 12/1995 | Li et al. |
| 5,535,395 A | 7/1996 | Tipley et al. |
| 5,544,077 A | 8/1996 | Hershey |
| 5,579,491 A | 11/1996 | Jeffries et al. |
| 5,600,828 A | 2/1997 | Johnson et al. |
| 5,666,486 A | 9/1997 | Alfieri et al. |
| 5,732,206 A | 3/1998 | Mendel |
| 5,812,821 A | 9/1998 | Sugi et al. |
| 5,832,299 A | 11/1998 | Wooten |
| 5,850,573 A | 12/1998 | Wada |
| 5,870,571 A | 2/1999 | Duburcq et al. |
| 5,909,544 A | 6/1999 | Anderson et al. |
| 5,951,683 A | 9/1999 | Yuuki et al. |
| 5,991,813 A | 11/1999 | Zarrow |
| 5,996,024 A | 11/1999 | Blumenau |
| 5,996,027 A | 11/1999 | Volk et al. |
| 6,006,259 A | 12/1999 | Adelman et al. |
| 6,009,476 A | 12/1999 | Flory et al. |
| 6,009,480 A | 12/1999 | Pleso |
| 6,018,765 A | 1/2000 | Durana et al. |
| 6,041,381 A | 3/2000 | Hoese |
| 6,078,957 A | 6/2000 | Adelman et al. |
| 6,108,300 A | 8/2000 | Coile et al. |
| 6,108,699 A | 8/2000 | Moiin |
| 6,131,119 A | 10/2000 | Fukui |

(Continued)

OTHER PUBLICATIONS

"U.S. Appl. No. 09/706,519, Advisory Action mailed Jul. 23, 2007", 3 pgs.

(Continued)

*Primary Examiner*—Ricky Ngo
*Assistant Examiner*—Kan Yuen
(74) *Attorney, Agent, or Firm*—Schwegman, Lundberg & Woessner, P.A.

(57) ABSTRACT

Many storage-area networks (SANs) were developed to facilitate high-speed storage of large quantities of digital data. However, at least some conventional SANs present increased maintenance costs and complexities that can discourage their use. For example, in some SANs, its difficult and time consuming to properly reconfigure a Fiber Channel switch after a system failure since the switch is configurable by multiple entities. Accordingly, the present inventors devised, among other things, a method and systems for automatically maintaining and synchronizing one or more backup copies of configuration data.

12 Claims, 4 Drawing Sheets

U.S. PATENT DOCUMENTS

| | | | |
|---|---|---|---|
| 6,134,673 | A | 10/2000 | Chrabaszcz |
| 6,145,019 | A | 11/2000 | Firooz et al. |
| 6,163,855 | A | 12/2000 | Shrivastava et al. |
| 6,178,445 | B1 | 1/2001 | Dawkins et al. |
| 6,185,620 | B1 | 2/2001 | Weber et al. |
| 6,195,687 | B1 | 2/2001 | Greaves et al. |
| 6,195,760 | B1 | 2/2001 | Chung et al. |
| 6,209,023 | B1 | 3/2001 | Dimitroff et al. |
| 6,219,771 | B1 | 4/2001 | Kikuchi et al. |
| 6,268,924 | B1 | 7/2001 | Koppolu et al. |
| 6,269,396 | B1 | 7/2001 | Shah et al. |
| 6,314,526 | B1 | 11/2001 | Arendt et al. |
| 6,343,320 | B1 | 1/2002 | Fairchild et al. |
| 6,363,416 | B1 | 3/2002 | Naeimi et al. |
| 6,378,025 | B1 | 4/2002 | Getty |
| 6,393,583 | B1 | 5/2002 | Meth et al. |
| 6,400,730 | B1 | 6/2002 | Latif et al. |
| 6,449,652 | B1 | 9/2002 | Blumenau et al. |
| 6,470,382 | B1 | 10/2002 | Wang et al. |
| 6,470,397 | B1 | 10/2002 | Shah et al. |
| 6,473,803 | B1 | 10/2002 | Stern et al. |
| 6,480,901 | B1 | 11/2002 | Weber et al. |
| 6,484,245 | B1 | 11/2002 | Sanada et al. |
| 6,574,755 | B1 | 6/2003 | Seon |
| 6,591,310 | B1 | 7/2003 | Johnson |
| 6,597,956 | B1 | 7/2003 | Aziz et al. |
| 6,640,278 | B1 | 10/2003 | Nolan et al. |
| 6,654,830 | B1 | 11/2003 | Taylor et al. |
| 6,658,459 | B1 | 12/2003 | Kwan et al. |
| 6,678,721 | B1 | 1/2004 | Bell |
| 6,683,883 | B1 | 1/2004 | Czeiger et al. |
| 6,691,244 | B1 | 2/2004 | Kampe et al. |
| 6,697,924 | B2 | 2/2004 | Swank |
| 6,701,449 | B1 | 3/2004 | Davis et al. |
| 6,718,361 | B1 | 4/2004 | Basani et al. |
| 6,721,907 | B2 | 4/2004 | Earl |
| 6,724,757 | B1 | 4/2004 | Zadikian et al. |
| 6,738,854 | B2 | 5/2004 | Hoese et al. |
| 6,748,550 | B2 | 6/2004 | McBrearty et al. |
| 6,757,291 | B1 | 6/2004 | Hu |
| 6,760,783 | B1 | 7/2004 | Berry |
| 6,763,195 | B1 | 7/2004 | Willebrand et al. |
| 6,763,419 | B2 | 7/2004 | Hoese et al. |
| 6,766,520 | B1 | 7/2004 | Rieschl et al. |
| 6,771,663 | B1 | 8/2004 | Jha |
| 6,771,673 | B1 | 8/2004 | Baum et al. |
| 6,799,316 | B1 | 9/2004 | Aguilar et al. |
| 6,807,581 | B1 | 10/2004 | Starr et al. |
| 6,823,418 | B2 | 11/2004 | Langendorf et al. |
| 6,856,591 | B1 | 2/2005 | Ma et al. |
| 6,859,462 | B1 | 2/2005 | Mahoney et al. |
| 6,877,044 | B2 | 4/2005 | Lo et al. |
| 6,886,171 | B2 | 4/2005 | MacLeod |
| 6,895,461 | B1 | 5/2005 | Thompson |
| 6,920,491 | B2 | 7/2005 | Kim |
| 6,938,092 | B2 | 8/2005 | Burns |
| 6,944,785 | B2 | 9/2005 | Gadir et al. |
| 6,980,525 | B2 | 12/2005 | Banks et al. |
| 7,039,870 | B2 | 5/2006 | Takaoka et al. |
| 2002/0010750 | A1 | 1/2002 | Baretzki |
| 2002/0042828 | A1 | 4/2002 | Kampe et al. |
| 2002/0049845 | A1 | 4/2002 | Sreenivasan et al. |
| 2002/0055978 | A1 | 5/2002 | Joon-Bo et al. |
| 2002/0059392 | A1 | 5/2002 | Ellis |
| 2002/0065872 | A1 | 5/2002 | Genske et al. |
| 2002/0103943 | A1 | 8/2002 | Lo et al. |
| 2002/0116460 | A1 | 8/2002 | Treister et al. |
| 2002/0126680 | A1 | 9/2002 | Inagaki et al. |
| 2002/0156612 | A1 | 10/2002 | Schulter et al. |
| 2002/0188657 | A1 | 12/2002 | Traversat et al. |
| 2002/0188711 | A1 | 12/2002 | Meyer et al. |
| 2002/0194428 | A1 | 12/2002 | Green |
| 2003/0005068 | A1 | 1/2003 | Nickel et al. |
| 2003/0018756 | A1 | 1/2003 | Nguyen et al. |
| 2003/0018813 | A1 | 1/2003 | Antes et al. |
| 2003/0018927 | A1 | 1/2003 | Gadir et al. |
| 2003/0058870 | A1 | 3/2003 | Mizrachi et al. |
| 2003/0084209 | A1 | 5/2003 | Chadalapaka |
| 2003/0097607 | A1 | 5/2003 | Bessire |
| 2003/0137941 | A1 | 7/2003 | Kaushik et al. |
| 2003/0182455 | A1 | 9/2003 | Hetzler et al. |
| 2003/0208579 | A1 | 11/2003 | Brady et al. |
| 2003/0210686 | A1 | 11/2003 | Terrell et al. |
| 2003/0237016 | A1* | 12/2003 | Johnson et al. ................ 714/4 |
| 2004/0022256 | A1 | 2/2004 | Green |
| 2004/0024778 | A1 | 2/2004 | Cheo |
| 2004/0064553 | A1 | 4/2004 | Kjellberg |
| 2004/0078599 | A1 | 4/2004 | Nahum |
| 2004/0141468 | A1 | 7/2004 | Christensen |
| 2004/0233910 | A1 | 11/2004 | Chen et al. |
| 2005/0038836 | A1* | 2/2005 | Wang ........................ 707/204 |
| 2005/0055418 | A1 | 3/2005 | Blanc et al. |
| 2005/0063313 | A1 | 3/2005 | Nanavati et al. |
| 2005/0195736 | A1* | 9/2005 | Matsuda ..................... 370/216 |
| 2005/0216788 | A1* | 9/2005 | Mani-Meitav et al. ......... 714/6 |
| 2005/0262233 | A1 | 11/2005 | Alon et al. |
| 2005/0268151 | A1 | 12/2005 | Hunt et al. |
| 2006/0117211 | A1* | 6/2006 | Matsunami et al. ............ 714/4 |
| 2006/0117212 | A1* | 6/2006 | Meyer et al. ................... 714/4 |
| 2006/0265529 | A1 | 11/2006 | Kuik et al. |

OTHER PUBLICATIONS

"U.S. Appl. No. 09/706,519, Final Office Action mailed May 4, 2007", 19 pgs.

"U.S. Appl. No. 09/706,519, Non Final Office Acction mailed Oct. 11, 2006", 12 pgs.

"U.S. Appl. No. 09/706,519, Response filed Feb. 12, 2007 to Non Final Office Action mailed Oct. 11, 2006", 20 pgs.

"U.S. Appl. No. 09/706,519, Response filed Jul. 5, 2007 to Final Office Action mailed May 4, 2007", 18 pgs.

"U.S. Appl. No. 09/706,519, Response filed Aug. 6, 2007 to Advisory Action mailed Jul. 23, 2007", 6 pgs.

*VMware ESX Server: User's Manual*, Version 1.0, obtained from http://web.archive.org/web/20010608201203/www.vmware.com/support,(Jun. 6, 2001),122-124.

Bakker, G. , *IP Aliasing*, obtained from http://www.zone-h.org/files/24/ip_aliasing.txt,(1999),3 pgs.

Gusella, R. , et al., "An Election Algorithm for a Distributed Clock Synchronization Program", *Report No. UCB/CSD 86/257*, University of California, Berkeley,(Dec. 1985),1-17.

Gusella, R. , et al., "The Berkeley UNIX Time Synchronization Protocol", *UNIX Programmers Manual 4.3;* vol. 2C, Berkeley Software Distrib.,,(1986),10 pgs.

Knight, S. , et al., *Virtual Router Redundancy Protocol*, Network Working Group, RFC 2338, obtained from http://www.search.ietf.org/rfc/rfc2338.txt,(1998),26 p.

Lewis, P. , "A High-Availability Cluster for Linux", *Linux Journal*, 64, obtained from http://www2.linuxjournal.com/lj-issues/issue64/3247.html,(Apr. 1994),11 p.

Li, T. , et al., *Cisco Hot Standby Router Protocol (HSRP)*, Network Working Group, RFC 2281, obtained from http://www.search.ietf.org/rfc/rfc2281.txt,(1998),16 p.

Meth, K. Z., et al., "Design of the iSCSI protocol", *Proceedings of the 20th IEEE Conference on Mass Storage Systems and Technologies*, (Apr. 7-10, 2003),116-122.

Moore, K. , *On the Use of HTTP as a Substrate*, Network Working Group, RFC 3205, obrtained from http://www.search.ietf.org/rfc/rfc3205.txt,(2002),14 p.

Satran, J. , et al., "iSCSI", *IPS Internet Draft, draft-ietf-ips-iSCSI-12.txt, Category: standards—track*, (Apr. 17, 2002),260 pgs.

Satran, J., et al., "iSCSI", *IPS Internet Draft, draft-ietf-ips-iSCSI-00, Category: Standards Track*, Retrieved from the Internet: <URL: http://www.haifa.il.ilb.com/satran/ips/draft-ietf-ips-iSCSI-00.txt>,(Nov. 2000),78 pgs.

Simitci, H., et al., "Evaluation of SCSP over TCP/IP and SCSI over fibre channel connections", *Hot Interconnects*, 9, (Aug. 2001),87-91.

* cited by examiner

SYNCHRONIZATION OF CONFIGURATION DATA IN STORAGE-AREA NETWORKS

TECHNICAL FIELD

Various embodiments of the present invention concern storage-area networks, especially storage routers and Fibre Channel switches suitable for such networks.

BACKGROUND

In recent years, the rapid growth of the Internet and other computer networks has fueled an equally fantastic growth in the use of computers as everyday communications devices for both individuals and businesses. Such widespread and growing use has led to the generation and accumulation of vast amounts of digital data. This, in turn, has spurred scientists and engineers to develop specialized subsystems, such as storage-area networks, for managing and storing data.

A storage-area network (SAN) is a high-speed subnetwork of shared data-storage devices, such as disk and tape drives. These networks are particularly advantageous not only because they spare other servers in a larger network, such as corporate intranet, from the burden of storing and managing large amounts of data, and thus allow use of these servers for other higher priority uses, but also because they facilitate data consolidation. Consolidation promotes manageability and scalability by for example simplifying backup and restore procedures and facilitating expansion of storage capacity.

Some storage-area networks (SANs) are structured so that an end-user or client-computer can access data on one or more target storage devices through a storage router and a separate Fibre Channel switch. (Fibre Channel generally refers to a serial data-transfer architecture and communications standard developed by a consortium of computer and storage-device manufacturers for use with high-speed mass-storage devices and other peripherals, particularly via optical fiber interconnects.) The Fibre Channel (FC) switch converts data received from the storage router to a FC-compliant protocol, such as FC-AL (Fibre Channel Arbitrated Loop) standard, and directs the converted data via high-speed electrical or optical fiber lines to the proper target devices. The FC switch, high-speed lines and related hardware are sometimes called a "fabric."

One problem that the present inventors have recognized with conventional storage-area networks, such as those that use separate FC switches and storage routers, is that these networks present increased maintenance complexities and costs that discourage their use by many companies and organizations. For example, administrators of these networks may be forced to manually and separately reconfigure the storage router and the FC switch in the event of a system failure. Moreover, the FC switch may be configured by different entities independently of the administrator, making it even more difficult, time-consuming, and costly to perform the restoration.

Accordingly, the present inventors have recognized a need to reduce the cost and complexities associated with maintaining storage-area networks.

SUMMARY

To address this and/or other needs, the present inventors devised methods, software, and related devices and systems that automatically maintain and synchronize one or more backup copies of configuration data for a Fibre Channel (FC) switch in a storage-area network. One exemplary method entails detecting a configuration change in a FC switch, and in response to detecting the change, updating a backup copy of configuration data stored in a memory external to the FC switch. One embodiment integrates the FC switch onto a common circuit board with an iSCSI-compliant storage router. Through these and other features, the exemplary embodiment ultimately reduces the cost and complexities associated with maintaining storage-area networks.

DETAILED DESCRIPTION OF EXEMPLARY EMBODIMENTS

This description, which references and incorporates the above-identified figures and the appended claims, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

Figure 1:
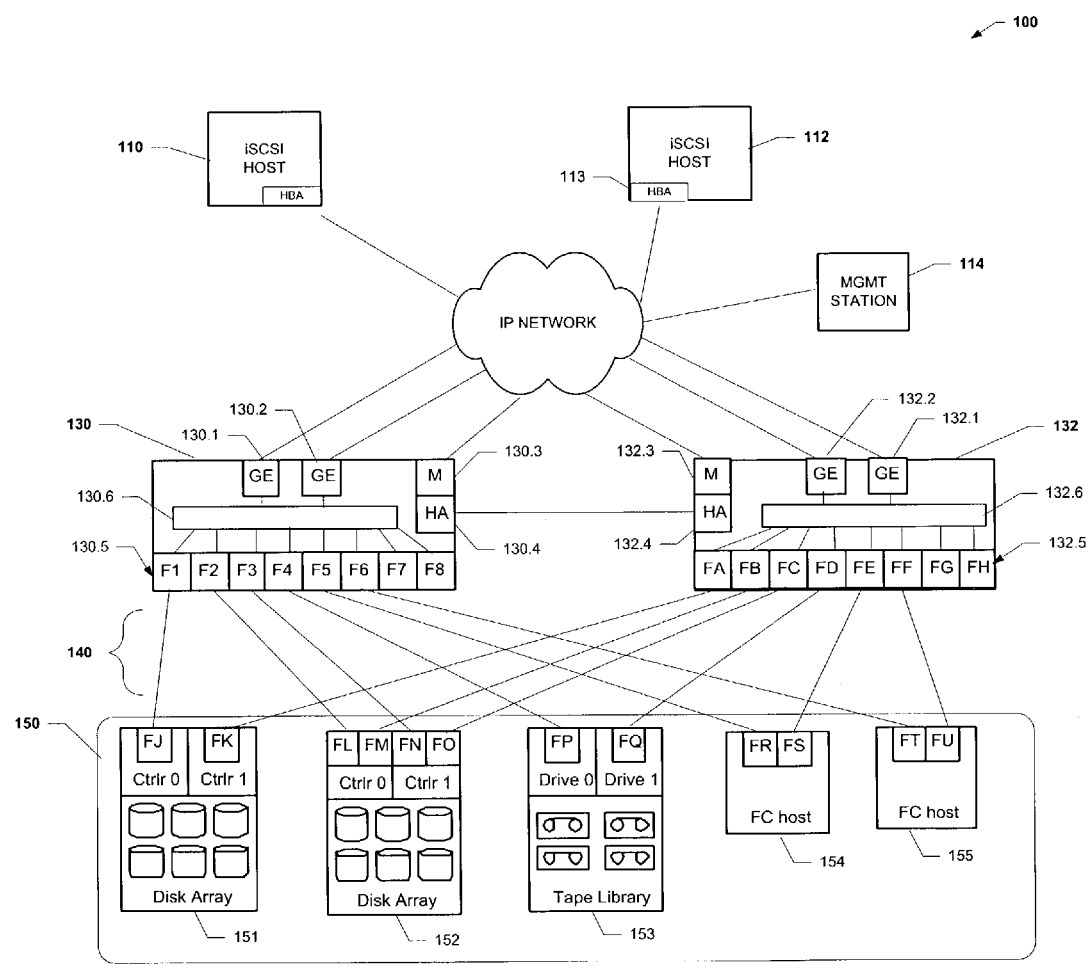
FIG. 1 is a block diagram of an exemplary system 100 that corresponds to one or more embodiments of the present invention.

FIG. 1 shows an exemplary computer system 100, which incorporates teachings of the present invention. System 100 includes iSCSI-compliant hosts 110 and 112, an IP network 120, integrated storage router-switches 130 and 132, Fibre Channel-compliant communications channels 140, and Fibre Channel (FC) hosts and devices 150.

iSCSI-compliant hosts 110 and 112, which take the exemplary forms of servers or other computer systems, and are substantially identical in this embodiment, include not only conventional features such as processors, memory, and an operating system (not shown), but also respective hardware or virtual host bus adapters 111 and 113.

Host bus adapters 111 and 113 comply with a version of the Internet Small Computer System Interface (iSCSI) protocol for storage of data over an IP network. The host bus adapters facilitate encapsulation and communication of Small Computer System Interface (SCSI) input-output commands using an Internet Protocol, such as TCP/IP. For details regarding a virtual host bus adapter and related software modules, see co-pending and co-owned U.S. patent application Ser. No. 10/143,561 (Cisco seq. no. 6122) entitled System, Method, and Software for Target ID Binding in a Storage-area Network and U.S. patent application Ser. No. 10/143,456 (Cisco Seq. No. 6126) entitled System, Method, and Software for a Virtual Host Bus Adapter in a Storage-area Network. Both of the applications were filed on May 9, 2002 and are incorporated herein by reference.

In the exemplary embodiment, the host bus adapter includes a network interface card or a Gibabit Ethernet server card, which includes a Gigabit Ethernet driver. Other embodiments use any IP-capable interfaces, for example, 10/100 Ethernet, wireless local-area network (LAN), Asynchronous Transfer Mode (ATM), etc. Host bust adapters 111 and 113 support communications via IP network 120 with integrated storage router-switches 130 and 132.

Integrated storage router-switches 130 and 132 are substantially identical in the exemplary embodiment. Router-switch 130 includes GE ports 130.1 and 130.2, a management (M) port 130.3, a high-availability (HA) port 130.4, and a FC port set 130.5. Router-switch 132 similarly includes GE ports 132.1 and 132.2, a management (M) port 132.3, a high-availability (HA) port 132.4, and a FC port set 132.5.

GE ports 130.1 and 130.2 are coupled respectively to GE switches 120 and 122, and GE ports 132.1 and 132.2 are similarly coupled to the GE switches. M ports 130.3 and 132.3 are coupled to each other, and HA ports 130.4 and 132.4 are also coupled to each other.

FC port set 130.5 includes ports F1-F8, which are operatively coupled via router-switch interface 130.6 to GE ports 130.1 and/or 130.2. FC port set 132.5 includes optical ports FA-FH, which are operatively coupled via router-switch interface 132.6 to GE ports 132.1 and/or 132.2.

In the exemplary embodiment, all the Fibre-Channel ports are general ports, which can function as fabric, fabric-looped, or N ports. Router-switch interface 130.6 includes software for making GE ports 132.1 and 132.2 and FC port set 130.5 appear to hosts 110 and 112 as a single integrated device. Fibre-Channel ports in port sets 130.5 and 132.5 are coupled via Fibre-Channel compliant communication channels 140, for example, optical fiber cables, to FC hosts and devices 150. In the exemplary embodiment, router-switches 130 and 132 conform to a version of the Fibre-Channel standard, such as Fibre Channel Arbitrated Loop (FC-AL) standard.

FC hosts and devices 150, which together with router-switches 130 and 132 and channels 140 constitute a FC-compliant storage-area network, includes disk arrays 151 and 152, a tape library 153, and FC hosts 154 and 155. Disk array 151 is accessible via FC ports FJ and FK, which are coupled respectively to ports F1 and FA of router-switches 130 and 132. Disk array 152 is accessible via FC ports FL, FM, FN, FO, which are coupled respectively to ports F2, FB, F3, and FC. (Disk arrays 151 and 152 are RAIDs (Redundant Array of Independent (or Inexpensive) Disks) or JBODs (Just a Bunch of Disks.) Tape library 153 is accessible via FC ports FP and FQ, which are coupled respectively to ports F4 and FD. Each of the target storage devices has an associated logical unit number (not shown.)

FC host 154 includes FC ports FR and FS, which are coupled respectively to port F7 and FG. And, FC host 155 includes FC ports FT and FU, with port FT coupled to port F8 of switch-router 130 and port FU coupled to port FH of switch-router 132. FC hosts 154 and 155 can access disk arrays 151 and 152 and a tape library 153 through router-switch 130 and/or 132. In this embodiment, access control between the FC host and the storage device is not provided; thus, any host using one of the router-switch's FC interfaces can access any device coupled to router-switches 130 and 132. However, some other embodiments include access control.

Normal operations of the router-switch include system initialization. In the exemplary embodiment, system initialization includes executing start-up diagnostics, starting and initializing applications, initializing or configuring the switch, and verifying switch operation. The initialization of the switch and the router portion are synchronized so that the entire system is made operational in a controlled fashion.

After initialization, host 110 or 112 accesses one or more of target storage devices 151, 152, and/or 153 through its operating system. The operating system forwards a block-level input-output command to HBA 111 or 113, which in turn communicates the command and any associated data in an appropriate format (with target and LUN addresses or names) through a TCP/IP socket and GE switch 120 or 122 to one of GE ports 130.1, 130.2, 132.1 and 132.2. The router portion of switch-router 130 or 132 strips off the TCP/IP and iSCSI headers, maps the logical iSCSI targets to SCSI addresses, adds FC and FCP headers, and routes the logical command and data onto the switch portion that includes FC port set 130.5 (or 132.5). The switch portion then transfers the logical command and data via one of its FC ports and a Fibre Channel link to one or more of FC hosts and devices 150 based on the SCSI addresses.

In response to the command and any associated data, the appropriate target storage device communicates data and/or status information through the appropriate channel and through one of the FC ports of switch-routers 130 and 132. The receiving switch-router formats the data and status according to the iSCSI and TCP/IP protocols and transmits across an IP network to the host bus adapter of the iSCSI host (110 or 112) that initiated the input-output command.

Exemplary Router-Switch Architecture

Figure 2A:
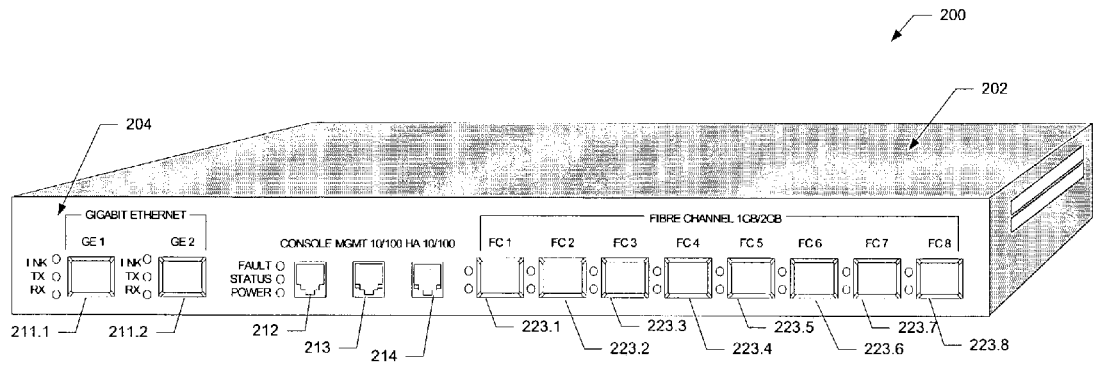
FIG. 2A is a perspective view of an exemplary integrated storage router-switch 200 that corresponds to one or more embodiments of the present invention.
Figure 2B:
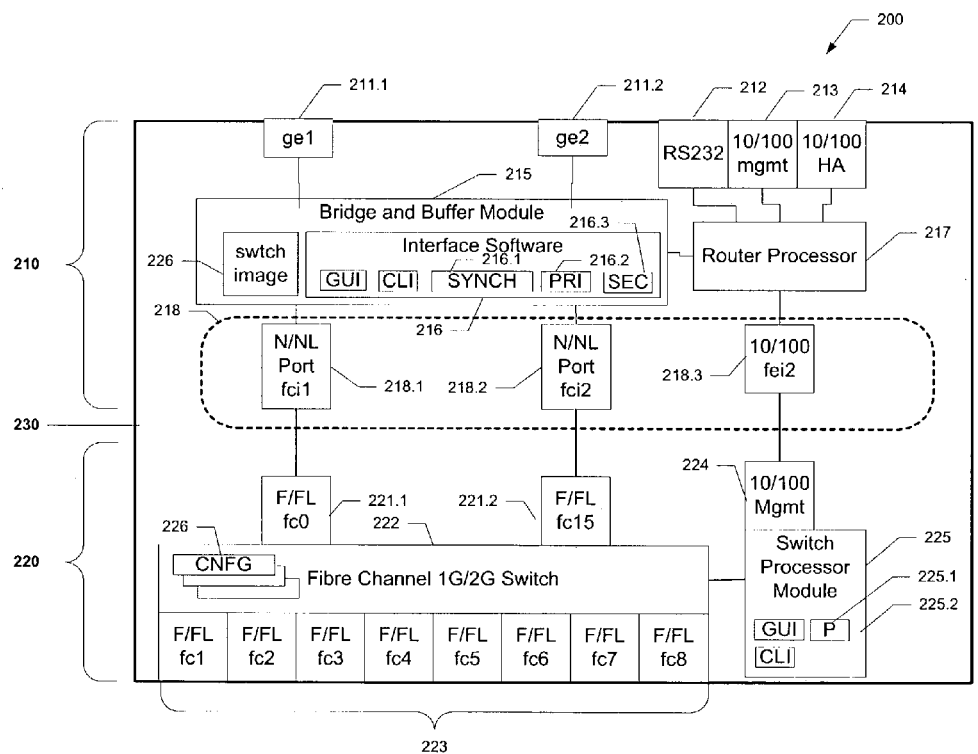
FIG. 2B is a block diagram showing further details of the integrated storage router-switch 200 that corresponds to one or more embodiments of the present invention.

FIGS. 2A and 2B shows details of an exemplary storage router-switch 200 which may be substituted for one or both of the integrated router-switches in FIG. 1.

FIG. 2A, a perspective view of router-switch 200, shows its 1U rack-mountable chassis or case 202, which includes a front panel 204. Front panel 204 includes GE port connectors 211.1 and 211.2, a console-port connector 212, a management-port connector 213, an HA-port connector 214, and FC port connectors (interfaces) 223.1-223.8. Each FC port has two associated LEDs (Light Emitting Diodes): one indicates whether the port is active and the other indicates whether the port is faulty. In the exemplary embodiment, each of connecters 212, 213, and 214 is a female RJ-45 (registered-jack 45) connector, and FC port connectors 223.1-223.8 take the form of female LC, MU, MTP, or MTRJ connectors. Other embodiments, however, use other types of connectors.

FIG. 2B, a block diagram, shows that router-switch 200 includes a router portion 210 and a switch portion 220 on a common motherboard 230. The motherboard is powered by a power supply (not shown) and cooled by common cooling system, such as a fan (also not shown).

Router portion 210 includes GE ports 211.1 and 211.2, console port 212, management port 213, high-availability (HA) port 214, bridge-and-buffer module 215, software 216, router processor 217, and router-to-switch interface 218. In the exemplary embodiment, router portion 210 complies with a version of the iSCSI protocol, such as draft 08 or later, and incorporates commercially available router technology, such as the 5420 Storage Router from Cisco System, Inc. of San Jose, Calif.

More particularly, GE ports 211.1 and 211.2 couple the router switch to an IP network for access by one or more servers or other computers, such as servers or iSCSI hosts (in FIG. 1). In some embodiments, GE ports 211.1 and 211.2 have respective MAC (Media Access Control) addresses, which are determined according to: base MAC address for the switch-router plus 31 minus the respective port number. (Two Gigabit Ethernet interfaces are available. Each ScsiRouter supports one or more IP addresses. The ScsiRouter IP address may be tied to any VLAN (virtual local-area network) on either GE interface.)

Console port 212 couples to a local control console (not shown). In the exemplary embodiment, this port takes the form of an RS-232 interface.

Management port 213 provides a connection for managing and/or configuring router-switch 110. In the exemplary embodiment, this port takes the form of a 10/100 Ethernet port and is assigned the base MAC address for the router-switch. As such, this port communicates via an IP protocol, for example, TCP/IP.

HA port 214 provides a physical connection for high-availability communication with another router-switch. In the exemplary embodiment, this port takes the form of a 10/100 Ethernet port, and is assigned the base MAC address plus 1. A failover occurs in the exemplary embodiment when: all devices used by the router-switch are inaccessible; the GE port used by the router-switch fails; router-to-switch interface 218 fails; or a switch failure is detected. A switch failure may cause the entire system, that is, the router-switch, to reboot.

Bridge-and-buffer module 215, which is coupled to GE ports 211.1 and 211.2, provides SCSI router services, which are compliant with a version of the iSCSI protocol. In the exemplary embodiment, module 215 incorporates a Peripheral Component Interface (PCI) bridge, such as the Galileo GT64260 from Marvell Semiconductor, Inc., of Sunnyvale, Calif. Also module 215 includes a 64-megabyte flash file system, a 1-megabyte boot flash, and a 256-megabyte non-volatile FLASH memory (not shown separately.) In addition to data and other software used for conventional router operations, module 215, in this exemplary embodiment, includes router-switch interface software 216.

Software 216 performs iSCSI routing between servers and the storage devices. In the exemplary embodiment, the software includes not only an integrated router-switch command-line-interface module CLI and a web-based graphical-user-interface module GUI that facilitate operation, configuration, administration, maintenance, and support of the router-switch. Both the command-line interface and the graphical user interface are accessible from a terminal via one or both of the ports 212 and 213.

Additionally, software 216 includes a synchronization module 216.1 which maintains backup copies of configuration and firmware data for the router and the FC switch, detects configuration and firmware changes, and updates or synchronizes one or more of the backup copies of the switch configuration data, such as a primary backup copy 216.2 (primary data) and a secondary backup copy 216.3 (secondary data), which are stored in a memory. FC switch configuration data includes both global and port-specific configuration data. The global configuration data includes domain-identification data, domain-identification lock status, buffer-to-buffer credit, a distributed-services-timeout setting, fabric-services-timeout setting, an error-detect-timeout setting, a resource-allocation timeout setting, a zoning merge, zoning default, zoning autosave, and device-discovery timeout. Port-specific configuration data includes inputs for enabling the port, AL-fairness, fabric-address notification (FAN), in-band-management (MS), multi-frame sequence (MFS) bundling, and for setting port-transfer rate, port type, and TL-port mode.

Various embodiments may store these sets of switch configuration data in any convenient storage device or location, including, for example, in a volatile or non-volatile memory on router portion 210 or in a non-volatile memory on a management station, such as management station 116 in FIG. 1.

The command-line-interface module and the graphical-user-interface module include command features (not shown) which allow a user to save a configuration of the switch-router to a persistent memory inside or outside the switch-router, or to restore the switch-router to a configuration stored in the persistent memory. Further details regarding exemplary operation and architecture of synchronization module 216 are described in a separate section below.

Router Processor 217, in the exemplary embodiment, is implemented as a 533-MHz MPC7410 PowerPC from Motorola, Inc. of Schaumburg, Ill. This processor includes 1-megabyte local L2 cache (not shown separately). In the exemplary embodiment, router processor 217 runs a version of the VX Works operating system from WindRiver Systems, Inc. of Alameda, Calif. To support this operating system, the exemplary embodiment also provides means for isolating file allocations tables from other high-use memory areas (such as areas where log and configuration files are written.)

Coupled to router processor 217 as well as to bridge-and-buffer module 215 is router-to-switch (RTS) interface 218. RTS interface 218 includes N/NL switch-interface ports 218.1 and 218.2 and management-interface port 218.3.

Switch-interface ports 218.1 and 218.2 are internal FC interfaces through which the router portion conducts input-output (I/O) operations with the switch portion. When a mapping to a FC storage device is created, the router-switch software automatically selects one of the switch-interface ports to use when accessing the target device. The internal interfaces are selected at random and evenly on a per-LUN (logical unit number) basis, allowing the router-switch to load-balance between the two FC interfaces. The operational status of these internal FC interfaces is monitored by each active SCSI Router application running on the switch-router. The failure of either of these two interfaces is considered a unit failure, and if the switch-router is part of a cluster, all active SCSI Router applications will fail over to another switch-router in the cluster. Other embodiments allow operations to continue with the remaining switch-interface port. Still other embodiments include more than two switch-interface ports with various allocation algorithms.

In the exemplary embodiment, the N/NL switch-interface ports can each use up to 32 World Wide Port Names (WWPNs). The WWPNs for port 218.1 are computed as 28+virtual port+base MAC address, and the WWPNs for port 218.2 are computed as 29+virtual port+base MAC address. Additionally, management of switch-interface ports 218.1 and 218.2 is hidden from the user. One exception is the WWPN of each internal port. The internal WWPNs are called "initiator" WWPNs. Users who set up access control by WWPN on their FC devices set up the device to allow access to both switch-router initiator WWPNs.

Switch-interface port 218.3 is used to exchange configuration data and get operational information from switch portion 220 through its management-interface port 224. In the exemplary embodiment, switch-interface port 218.3 is a 10/100 Ethernet port. In the exemplary embodiment, this exchange occurs under the control of a switch management Application Program Interface (API) that is part of interface software 216. One example of a suitable commercially available API is from QLogic Corporation of Aliso Viejo, Calif. Ports 218.1, 218.2, and 218.3 are coupled respectively to FC interface ports 221.1 and 221.2 and interface port 224 of switch portion 220.

Switch portion 220, which in the exemplary embodiment incorporates commercially available technology and supports multiple protocols including IP and SCSI, additionally includes internal FC interface ports 221.1 and 221.2, an FC switch 222, external FC ports (or interfaces) 223, a management interface port 224, and a switch processor module 225.

FC interface ports 221.1 221.2 are coupled respectively to ports of 218.1 and 218.2 of the router-to-switch interface via copper traces on or within board 230 or internal optical fiber links, thereby forming internal FC links. (In the exemplary embodiment, each external FC interface supports auto-negotiation as either an F or FL port, and the internal FC interfaces are fixed as either an F or FL port.)

FC switch 222, in the exemplary embodiment, incorporates a SANbox2-16 FC switch from QLogic Corporation. This SANbox2 switch includes QLogic's Itasca switch ASIC (application-specific integrated circuit.) Among other things, this switch supports Extended Link Service (ELS) frames that contain manufacturer information. FC switch 222 also includes one or more sets of switch configuration data 222.1, which are subject to modification not only via commands from "storage-side" components, such as FC servers, hosts, and controllers, but also via commands from "router-side" components, such as a management station, command-line interface, or graphical user interface. Various embodiments may store these sets of switch configuration data in any convenient storage location, including for example, in one of the target storage devices or in a volatile or non-volatile memory anywhere on switch portion 220.

FC ports 223.1-223.8, which adhere to one or more FC standards or other desirable communications protocols, can be connected as point-to-point links, in a loop or to a switch. For flow control, the exemplary embodiment implements a FC standard that uses a look-ahead, sliding-window scheme, which provides a guaranteed delivery capability. In this scheme, the ports output data in sets of operatively related frames called sequences, with each frame having a header, a checksum, and a maximum length, such as 2148 bytes.

Moreover, the FC ports are auto-discovering and self-configuring and provide 2-Gbps full-duplex, auto-detection for compatibility with 1-Gbps devices. For each external FC port, the exemplary embodiment also supports: Arbitrated Loop (AL) Fairness; Interface enable/disable; Linkspeed settable to 1 Gbps, 2 Gbps, or Auto-sensing; Multi-Frame Sequence bundling; Private (Translated) Loop mode.

Switch processor module 225 operates the FC switch and includes a switch processor (or controller) 225.1, and associated memory that includes a switch management agent 225.2. In the exemplary embodiment, switch processor 225.1 includes an Intel Pentium processor and a Linux operating system. Additionally, processor 225 has its own software image, initialization process, configuration commands, command-line interface, and graphical user interface (not shown). (In the exemplary embodiment, this command-line interface and graphical-user interface are not exposed to the end user.) A copy of the switch software image for the switch portion is maintained as a tar file 226 in bridge-and-buffer module 215 of router portion 210.

Exemplary Management Communications

The exemplary router-switch implement a novel communications method to make router portion 210 and switch portion 220 appear as an integrated device, particularly as viewed through management interface 213. To this end, software 216 includes an SNMP router-management agent and an MIB router handler (not shown.) (SNMP denotes the Simple Network Management Protocol, and MIB denotes Management Information Base (MIB)). The agent and handler cooperate with counterparts in switch portion 220 (also not shown) to provide integrated management and control of router and switching functions in router-switch 200.

Specifically, the exemplary embodiment implements or supports Fibre Alliance MIB 3.0, which entails loading MIB objects as separate modules, and adding them to a global MIB database that the SNMP router-management agent uses when resolving objects to a particular set of MIB handlers. In the exemplary embodiment, the SNMP router-management agent is based on the Wind River WindNet v1/v2c SNMP Agent code base, and an SNMP switch-management agent is based on the Linux UCD-SNMP code base.

Figure 3:
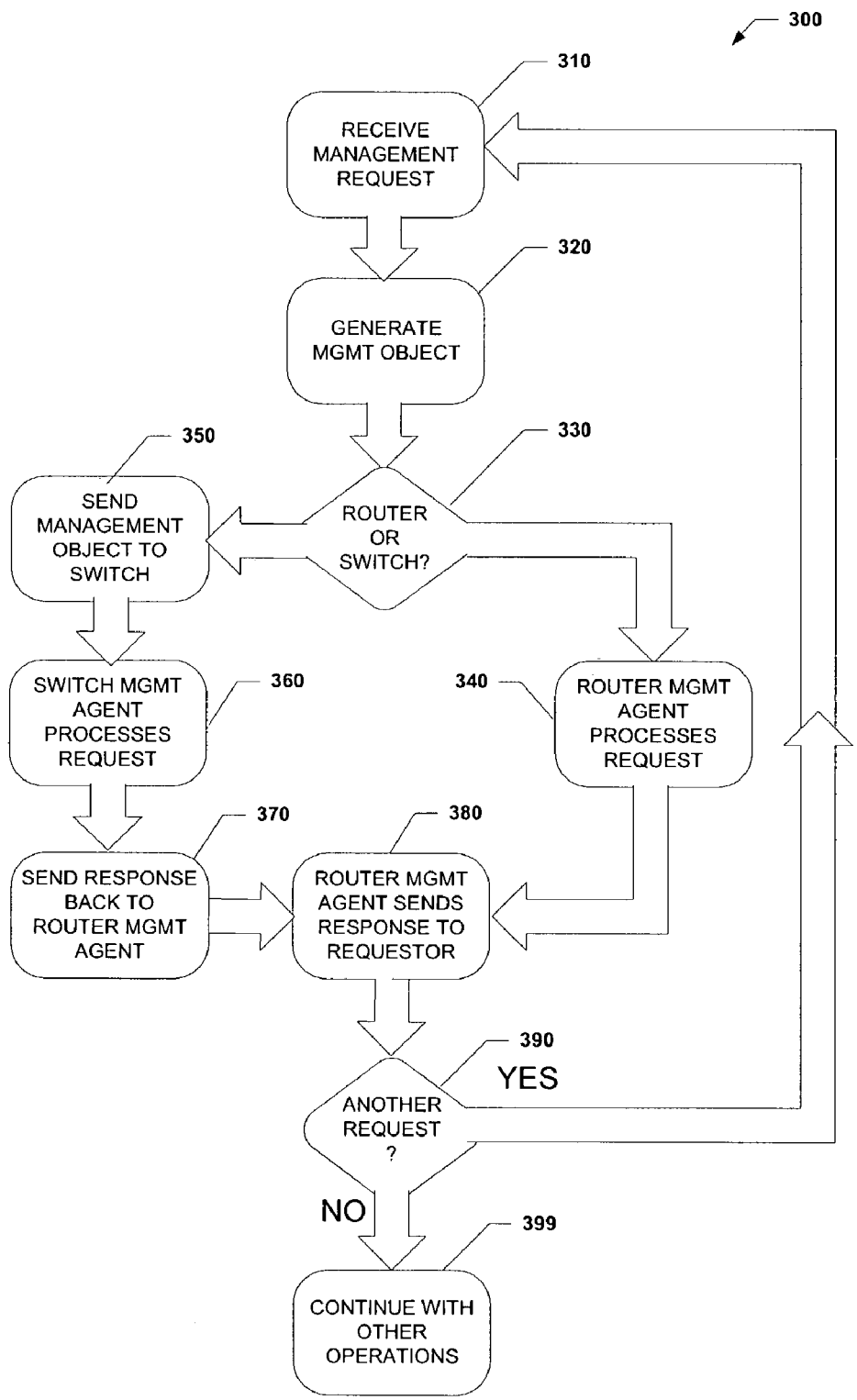
FIG. 3 is a flow chart showing details of an exemplary management communications method that corresponding to one or more embodiments of the present invention.

More specifically, FIG. 3 shows a flow chart 300 illustrating an exemplary method of using these agents and associated handlers. (The exemplary method is also applicable to management functions invoked via a graphical-user or command-line interface.) Flow chart 300 includes process blocks 310-399, which are arranged and executed in a particular order in the exemplary embodiment. However, other embodiments of the invention may reorder the execution of two or more blocks or portions thereof and/or execute two or more blocks or portions thereof in parallel. Moreover, the exemplary process flow applies to software, firmware, and hardware implementations.

Block 310 shows that the exemplary method begins with router-management agent AGT (in FIG. 2) receiving a management inquiry in the form of SNMP get or getNext request via management port 213 from an SNMP management station (not shown) connected to a management network (not shown). Execution continues at block 320.

In block 320, the router-management agent processes the management inquiry, which in the exemplary embodiment takes the form of an SNMP get or get-next request, by generating at least one SNMP management-request object.

In block 330, the router-management agent determines whether the management-request object relates to router or switch functions. If the object concerns router functions or can otherwise be fulfilled by the router-management agent, execution branches to block 340, which entails the router-management agent processing the request object, and then to block 380.

If, at block 330 the request object is determined to concern switch functions or otherwise cannot be fulfilled by the router-management agent, execution branches first to block 350 which entails mapping the request to a switch request and then sending the request object to the switch management agent, second to block 360 which entails the switch-management agent processing the request object, and third to block 370, which entails sending the response to the request back to the router-management agent. In some embodiments, the router-management agent, at block 360, may also perform other scheduled maintenance tasks, such as retrieve all or one or more portions of a set (or sets) of switch configuration data stored on the FC switch.

In the exemplary embodiment, the request object and its response are communicated between the router-management agent and the switch-management agent via the internal Ethernet link defined by ports 218.3 and 224. Also note that in the exemplary embodiment, the FC-management handler will try as many as three times to get a valid response from the switch-management agent, with a timeout of 0.3 seconds per request. If it does not get a valid response after three tries, an SNMP error signal is passed back to the router-management agent and ultimately onto the management station. Additionally, entries for non-user (internal) FC ports are filtered out from any responses passed back to the router-management agent.

The exemplary embodiment uses two data structures to facilitate communications between the FC-management handler and the switch-management agent. For each group of MIB objects, the exemplary embodiment maintains a branch information table, and for each object within a group, there also exists a leaf information object. The exemplary branch information data structure (FcSwSnmpBranchInfo) includes the following fields:

oidCount—specifies number of elements in oidList.
    oidList—pointer to SNMP Object ID for group.
    leafCount—specifies number of elements in leafInfo.
    leafInfo—pointer to leaf information table for group.
    preInstFilter—function pointer that allows filtering and adjustment on SNMP instance value before request is sent to FC Switch SNMP Agent.
    postInstFilter—function pointer that allows filtering and adjustment on SNMP instance value after response is received from FC Switch SNMP Agent.
    valueFilterLastmatch—specifies last component of SNMP object ID, used to return an additional object with request.
    postValueFilter—function pointer that allows filtering based on an object value.
    copyValue—function pointer that allows for overriding of an object value in response.

And, the exemplary leaf information data structure (FcSwSnmpLeafInfo) includes the following fields:

lastmatch—specifies last element of SNMP Object ID within group.
    type—specifies SNMP object type.
    requestLastmatch—specifies an optional value used to override lastmatch value.

The branch and leaf data structures allow the FC management module to handle the following:

Mapping of the port index from 1 through 8 on the Storage Router to actual FC Switch ports, while filtering non-user ports.
    Filtering of entries from the connUnitLink table and connUnitSns table based on the value of an object within a particular entry.
    The overriding of response values returned by the FC Switch SNMP Agent.
    The ability to return a response value for an object that does not exist in a particular table, due to an error in the FC Switch SNMP Agent.

After execution of block 370 as well as block 340, exemplary execution continues with block 380. In block 380, the router-management agent, which may be regarded as a master management agent to the switch- or slave-management agent for the switch, sends the response back to the management station (or other requester.) The exemplary embodiment sends the response back via management port 213. In some embodiments, the router-management agent may also perform scheduled or event-driven maintenance-related tasks, such as retrieving one or more portions of a source set (or sets) of switch configuration data stored on the switch.

Next, block 390 determines whether there are further requests to be answered. If there are additional requests, execution of the exemplary method branches back to block 310. And, if there are no additional requests execution branches to block 399, which generally represents any other operations.

Exemplary Operation of Synchronization Module

Figure 4:
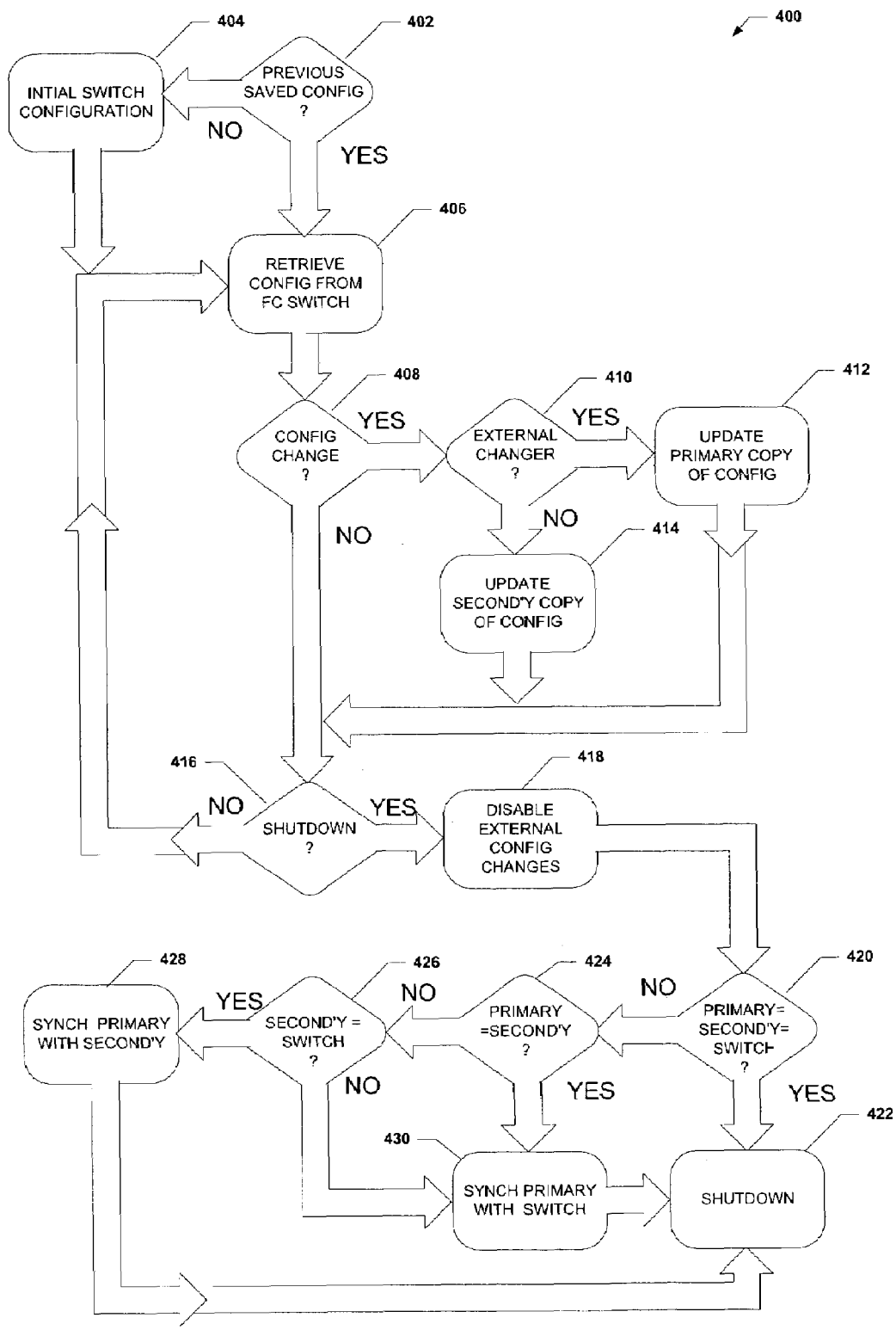
FIG. 4 is a flow chart showing details of an exemplary synchronization method that corresponds to one or more embodiments of the present invention.

FIG. 4 shows a flowchart 400 illustrating an exemplary architecture and method of operating synchronization module 216.1 (in FIG. 2.) Flow chart 400 includes process blocks 402-430. Though these blocks (and those of other flow charts in this document) are arranged serially in the exemplary embodiment, other embodiments may reorder the blocks, omit one or more blocks, combine two or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules.

The exemplary method begins at block 402, which entails determining whether a backup copy of switch configuration data has been created. In the exemplary embodiment, this entails examining a size or date stamp associated with primary backup data 216.2 and comparing it to the current date if a backup data file exists. If the determination indicates that no primary backup data exists (or that it is corrupted or otherwise invalid), then execution branches to block 404. However, if the determination indicates that primary backup data has been saved in a predetermined area or directory of storage-router memory (or other storage location), then execution branches to block 404; otherwise, execution continues at block 406.

Block 404 entails initializing the FC switch using a default configuration. In the exemplary embodiment, this default configuration is provided in memory of the router-switch during manufacture or during download of firmware for the router-switch; however, other embodiments may allow a user to define a default configuration. Some embodiments may copy this default configuration to the primary backup data or otherwise update the primary backup data to indicate the implementation of the default configuration.

Block 406 entails retrieving one or more set of switch configuration data from switch portion 220, or more precisely FC Switch 222. In the exemplary embodiment, the retrieval entails sending a management request to the switch and retrieving a set of switch configuration values or parameters that correspond to a selected one of a number of sets of switch configuration data, for example, a backup or current set of switch configuration data. However, other embodiments select the most recently updated set of switch configuration data. This notification can occur in response to the storage router registering with the FC switch to receive notification of specific types of changes.

In the exemplary embodiment, the retrieved switch configuration data includes one or more of the following parameters and/or associated identifiers: domain-identification data, domain-identification lock status, buffer-to-buffer credit, a distributed-services-timeout setting, fabric-services-timeout setting, error-detect-timeout setting, resource-allocation-timeout setting, a zoning merge, zoning default, zoning autosave, device-discovery-timeout setting, port enablement setting, AL-fairness, fabric-address notification, in-band-management, multi-frame-sequence bundling, port-transfer rate, port type, and TL-port mode. (The switch configuration data is subject to change via the router-switch management interface or via FC hosts.)

Block 408 determines whether the retrieved switch configuration data has been changed relative to the primary backup data stored on the router side of the FC switch. To this end, the exemplary embodiment compares each item in the retrieved switch configuration data to each corresponding item in the primary backup data and records results of the comparisons. If the determination indicates that primary backup data differs from the retrieved switch configuration data, execution branches to block 410.

Block 410 entails determining whether the retrieved switch configuration data was changed externally, for example by FC hosts or other entities on the storage-side of the FC switch. The exemplary embodiment can make this determination based on a log of commands it receives from the router-switch management interface. If the change was made externally (that is, not through the router-switch management port), execution advances to block 412, which updates the primary backup data to reflect the changes made to the switch configuration data. In some embodiments, the update entails replacing the existing primary backup data with the retrieved switch configuration data; other embodiments update the existing backup data by simply adding or appending the retrieved switch configuration data to a directory structure associated with the primary backup data, or by adding differential data that represents the difference in the current primary backup data and the retrieved switch configuration data.

However, if the change was not made externally, execution advances to block 414, which updates the secondary (or temporary) backup copy of the switch configuration data to reflect the switch-configuration changes. (Examples of non-external switch-configuration changes include those made through use of management or configuration commands in the graphical user interface or the command-line interface.) In some embodiments, the update entails replacing the existing secondary backup data with the retrieved switch configuration data; other embodiments update the existing secondary backup data by simply adding or appending the retrieved switch configuration data to a directory structure associated with the secondary backup data, or by adding differential data that represents the difference in the current secondary backup data and the retrieved switch configuration data. From blocks 412 and 414, execution continues at block 416.

In block 416, the router processor determines whether a shutdown mode has been invoked. In the exemplary embodiment, a shutdown mode is invoked by events, such as receipt of a command from a management interface or through a detected loss of power. (Other embodiments broaden the shutdown determination to include a standby mode or a power-conservation mode.) If the determination indicates that no shutdown or other analogous mode has been invoked, execution returns to block 406, which entails retrieving switch configuration data stored on the FC switch.

In the exemplary embodiment, this further retrieval occurs during normal operation of the router-switch. Specifically, during any management-related accesses of the FC switch (through internal management port 224, such as described in FIG. 3), the exemplary embodiment also retrieves a copy of one or more versions of the FC switch configuration data. In other embodiments, the switch configuration query or retrieval may occur in response to a request (from the command-line or graphic user interface, for example) to display the current switch configuration, or in response to a notification message or signal from the FC switch that its configuration is changed. In some embodiments, this notification procedure is established through process of the router processor registering to receive notice of specific types of changes from the FC switch. However, in other embodiments, the retrieval occurs on scheduled or other event-driven basis, for example, every 30, 60, or 90 minutes or during other predetermined types of management activities.

Block 418, which is executed if block 416 determines that a shutdown mode has been invoked, entails disabling or preventing external (storage-side) changes to the switch configuration data stored on the FC switch. To this end, the exemplary embodiment changes the setting of the "management server enable" feature to disabled. Other embodiments may disable switch hardware, such as the FC ports. Exemplary execution proceeds to block 420.

Block 420 entails determining whether the primary and secondary backup data and the switch configuration data match each other. In the exemplary embodiment, this determination entails retrieving switch configuration data from the FC switch and from the router memory and then comparing them item by item to identify any differences. If the determination is that the primary, secondary, and retrieved switch data match each other, then execution branches to block 422, which shuts down the router-switch or selected portions of it. In the exemplary embodiment, this is done via a reset command or via hardware reset of the switch. However, if the determination is that the three data sets do not match each other, execution branches to block 424.

In block 424, the router processor determines whether the primary backup data matches the secondary backup data. The exemplary embodiment determines this by performing an item-by-item comparison of the primary and secondary backup data. However, other embodiments may set a flag representative of a difference at the time a change is made to one or both of the data sets after they are synchronized and examine the status of the flag to make the determination. If the determination is that the primary and secondary data do not match each other, then execution progresses to block 426.

In block 426, the router processor determines whether the secondary set of switch configuration data matches the operative set of switch configuration data. If a match is determined, exemplary execution branches to block 428, which entails synchronizing or updating the primary backup data based on the secondary backup data. However, if a match is not determined, execution branches to block 440, which entails synchronizing or updating the primary backup data based on the retrieved switch configuration data.

From block 428 and block 440, execution advances to block 422, which entails shutting down the router-switch. The shutdown procedure may include ensuring the components are shutdown is a serial fashion or prepared to shutdown to minimize data loss in components which may not have been previously synchronized to non-volatile storage. Some embodiments allow isolation of the shutdown to the router portion or the switch portion, and leave the other portion operating.

CONCLUSION

The embodiments described in this document are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A method comprising:
    retrieving configuration data from a Fibre Channel (FC) switch;
    determining whether the retrieved configuration data includes a change;
    determining whether the change was made using a storage router coupled to the FC switch, in response to determining that the retrieved configuration data includes a change;
    updating a first set of backup configuration data, in response to determining that the change was made using the storage router; and updating a second set of backup configuration data, in response to determining that the change was not made using the storage router.

2. The method of claim 1, wherein determining whether the change was made using a storage router coupled to the FC switch comprises: determining whether the storage router received a command to change at least a portion of the configuration of the FC switch.

3. The method of claim 1, wherein the storage router and the FC switch share a common circuit board.

4. The method of claim 1, wherein the first and second sets of backup configuration data are stored on a memory in the storage router.

5. A machine-readable medium comprising coded instructions for performing the method of claim 1.

6. The method of claim 1, further comprising:
   determining whether the first and second sets of backup configuration data match each other; and
   updating the first set of backup configuration data based on a third set of configuration data for the FC switch in response to determining that the first and second sets of backup configuration data do not match each other.

7. The method of claim 1, wherein determining whether the first and second sets of backup configuration data match each other occurs in response to a command to shutdown the storage router.

8. The method of claim 1, further comprising:
   determining whether the second set of backup configuration data matches a third set of configuration data for the FC switch; and
   updating the first set of backup configuration data based on the second set of configuration data in response to determining that the second set of backup configuration data matches the third set.

9. The method of claim 1, wherein determining whether the first and second sets of backup configuration data match each other occurs in response to a command to shutdown the storage router.

10. The method of claim 1, wherein the storage router is iSCSI compliant.

11. Apparatus for use in a storage-area network, comprising:
   a plurality of Internet Protocol (IP) ports for coupling to a computer network;
   a router processor coupled to at least one of the IP ports;
   a switch processor coupled to the router processor;
   a Fibre Channel (FC) switch coupled to the switch processor;
   a plurality of FC ports coupled to the FC switch;
   a memory coupled to the router processor and comprising a set of coded instructions for:
      retrieving configuration data from the FC switch;
      determining whether the retrieved configuration data includes a change;
      determining whether the change was made as a result of one or more commands received through at least one of the IP ports, in response to determining that the retrieved configuration data includes a change;
      updating a first set of backup configuration data, in response to determining that the change was made as a result of one or more commands received through at least one of the IP ports; and
      updating a second set of backup configuration data, in response to determining that the change was not made as a result of one or more commands received through at least one of the IP ports; and
   an enclosure containing the router processor, the switch processor, the FC switch, and the memory.

12. The apparatus of claim 11, wherein the one of the IP ports comprises a management port.

* * * * *

UNITED STATES PATENT AND TRADEMARK OFFICE
CERTIFICATE OF CORRECTION

| | |
|---|---|
| PATENT NO. | : 7,433,300 B1 |
| APPLICATION NO. | : 10/401654 |
| DATED | : October 7, 2008 |
| INVENTOR(S) | : Bennett et al. |

Page 1 of 1

It is certified that error appears in the above-identified patent and that said Letters Patent is hereby corrected as shown below:

Title Page On Page 2, under "Other Publications", in column 2, line 3, delete "Acction" and insert -- Action --, therefor.

Title Page On Page 2, under "Other Publications", in column 2, line 35, delete "obrtained" and insert -- obtained --, therefor.

In Drawings

On Sheet 2 of 4, in Fig. 2B (Box 226), line 1, delete "swtch" and insert -- Switch --, therefor.

On Sheet 4 of 4, in Fig. 4 (Box 404), line 1, delete "INTIAL" and insert -- INITIAL --, therefor.

In column 3, line 45, after "FC." delete "(".

Signed and Sealed this

Twenty-seventh Day of January, 2009

JOHN DOLL
*Acting Director of the United States Patent and Trademark Office*